United States Patent
Grudetskyi et al.

(10) Patent No.: US 11,972,424 B1
(45) Date of Patent: Apr. 30, 2024

(54) DETECTION OF EVASIVE ITEM LISTINGS

(71) Applicant: Amazon Technologies, Inc., Seattle, WA (US)

(72) Inventors: Igor Grudetskyi, Seattle, WA (US); Masafumi Yamaguchi, Bellevue, WA (US); Yi Ren, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 330 days.

(21) Appl. No.: 17/462,439

(22) Filed: Aug. 31, 2021

(51) Int. Cl.
| | |
|---|---|
| *G06Q 30/02* | (2023.01) |
| *G06F 40/284* | (2020.01) |
| *G06Q 20/40* | (2012.01) |
| *G06Q 30/0601* | (2023.01) |
| *H04L 9/32* | (2006.01) |

(52) U.S. Cl.
CPC ......... *G06Q 20/401* (2013.01); *G06F 40/284* (2020.01); *G06Q 30/0601* (2013.01); *G06Q 30/0625* (2013.01); *G06Q 30/0633* (2013.01); *H04L 9/3213* (2013.01)

(58) Field of Classification Search
CPC ............. G06Q 20/401; G06Q 30/0601; G06Q 30/0625; G06Q 30/0633; G06Q 30/0207–30/0277; G06F 40/284; H04L 9/3213
See application file for complete search history.

(56) References Cited

U.S. PATENT DOCUMENTS

| | | | | |
|---|---|---|---|---|
| 8,145,662 | B2* | 3/2012 | Chen | G06F 16/285 |
| | | | | 707/767 |
| 8,458,213 | B2* | 6/2013 | Edmonds | G06Q 30/0282 |
| | | | | 707/731 |
| 8,885,928 | B2* | 11/2014 | Forman | G06F 18/2113 |
| | | | | 382/155 |
| 10,831,752 | B2* | 11/2020 | Bordawekar | G06N 20/00 |
| 10,896,292 | B1* | 1/2021 | Norton | G06V 30/12 |
| 11,288,453 | B1* | 3/2022 | Vinicombe | G06F 40/284 |
| 11,392,629 | B2* | 7/2022 | Agarwal | G06F 16/334 |
| 11,756,049 | B1* | 9/2023 | Shankar | G06Q 30/0206 |
| | | | | 705/7.35 |
| 2006/0069675 | A1* | 3/2006 | Ogilvie | G06F 16/9536 |
| 2006/0116862 | A1* | 6/2006 | Carrier | G06F 40/284 |
| | | | | 704/1 |
| 2008/0101689 | A1* | 5/2008 | Forman | G06F 18/2113 |
| | | | | 382/159 |

(Continued)

*Primary Examiner* — Thuy N Nguyen
(74) *Attorney, Agent, or Firm* — K&L Gates LLP

(57) ABSTRACT

Systems and techniques are generally described for detecting evasive terms in item listings. In some examples, a list of keywords associated with a first category of specified items may be received. In some examples, text data associated with a first item may be received. A first plurality of tokens representing a corrected version of the text data may be generated using spell correction techniques. In some cases, first flag data indicating that the text data constitutes evasive text may be generated based at least in part on the generation of the first plurality of tokens. The first flag data and a numerical representation of the first plurality of tokens may be input into a binary classifier trained to generate label data indicating whether text data associated with a given item is evasive or non-evasive. The binary classifier may generate label data indicating that the text data associated with the first item is evasive.

20 Claims, 6 Drawing Sheets

(56) References Cited

U.S. PATENT DOCUMENTS

| | | | | |
|---|---|---|---|---|
| 2011/0167121 | A1* | 7/2011 | Matzkel | H04L 67/06 |
| | | | | 709/206 |
| 2012/0191717 | A1* | 7/2012 | Chen | G06F 16/285 |
| | | | | 707/E17.069 |
| 2015/0379090 | A1* | 12/2015 | Gou | G06F 16/335 |
| | | | | 707/754 |
| 2016/0132608 | A1* | 5/2016 | Rathod | H04W 4/21 |
| | | | | 707/722 |
| 2016/0210678 | A1* | 7/2016 | Raman | G06Q 30/0627 |
| 2018/0060302 | A1* | 3/2018 | Liang | G06F 16/35 |
| 2019/0163817 | A1* | 5/2019 | Milenova | G06F 16/35 |
| 2020/0110809 | A1* | 4/2020 | DeFelice | G06N 3/045 |
| 2020/0311800 | A1* | 10/2020 | Srinivasan | G06Q 30/0633 |
| 2020/0371754 | A1* | 11/2020 | P K | G06F 40/56 |
| 2021/0034704 | A1* | 2/2021 | Gentile | G06F 40/30 |
| 2021/0312256 | A1* | 10/2021 | Mariano | G06F 16/248 |
| 2021/0334459 | A1* | 10/2021 | Dvijotham | G06F 40/284 |
| 2021/0390553 | A1* | 12/2021 | Brinig | G06F 40/169 |
| 2022/0166789 | A1* | 5/2022 | Murray | H04L 63/20 |
| 2022/0229983 | A1* | 7/2022 | Zohrevand | G06N 20/20 |
| 2022/0237368 | A1* | 7/2022 | Tran | G06N 3/088 |
| 2022/0237934 | A1* | 7/2022 | Matcham | G06F 18/285 |
| 2022/0269863 | A1* | 8/2022 | Araki | G06F 40/284 |
| 2022/0319219 | A1* | 10/2022 | Tsibulevskiy | G06T 3/60 |
| 2022/0414137 | A1* | 12/2022 | Sewak | G06F 16/313 |
| 2023/0004834 | A1* | 1/2023 | Subramaniam | G06Q 30/0201 |

\* cited by examiner

| Item 1 Text Data | Item 1 Category/sub-categories |
|---|---|
| Dustproof F.A.C.E.M.A.S.K Reusable with K.N.9.5 Carbon Filters, Disposable M@SK | /Beauty & Personal Care/ Products/Skin Care/Face/Masks |

| Item 2 Text Data | Item 2 Category/sub-categories |
|---|---|
| Smear-free Masc, volumizing | /Beauty & Personal Care/ Products/Makeup/Mascara |

| Item 3 Text Data | Item 3 Category/sub-categories |
|---|---|
| Baby Its COVID Outside 2020 Christmas Long Sleeve T-Shirt | /Clothing/T-shirts/Novelty items/ |

FIG. 3

DETECTION OF EVASIVE ITEM LISTINGS

BACKGROUND

Online transactional fraud attempts continue to grow year-over-year, putting pressure on retailers to innovate in order to protect customers and revenue. The field of online fraud detection can be categorized as an adversarial environment, where those with intentions to commit fraud are pitted against those endeavoring to prevent and deter such activity. This "arms race," as it is often referred to, involves continuous adaptation, as tactics of the opponents evolve over time. In a particularly egregious example of fraudulent activity, bad actors may seek to profit from tragedy and/or emergency situations by raising the prices of necessary goods during periods of increased demand following the tragedy/emergency. Such activity is typically referred to as "price gouging," and is widely considered highly unethical. For example, increasing the cost of hand sanitizer during a pandemic would be considered price gouging. Online retailers take steps to detect and remove listings and/or block third party sellers that engage in price gouging. However, due to the "arms race" described above, sellers evolve new techniques to evade heuristic-based filtering systems.

BRIEF DESCRIPTION OF DRAWINGS

FIG. 3 depicts examples of item listing data that may be detected as being evasive, in accordance with various aspects of the present disclosure.

DETAILED DESCRIPTION

Figure 1:
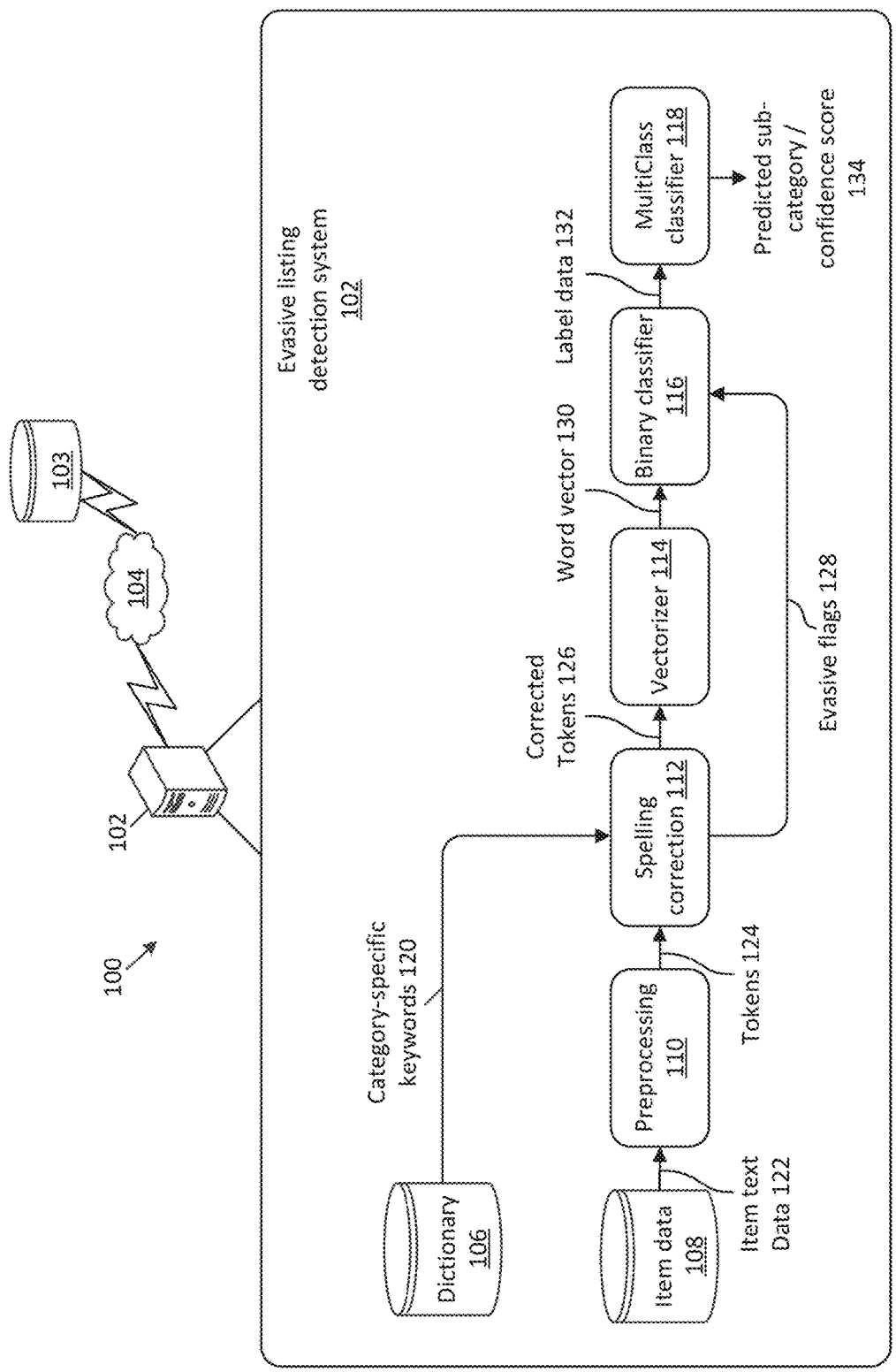
FIG. 1 is a block diagram depicting an example system effective to detect evasive listings, according to various embodiments of the present disclosure.

In the following description, reference is made to the accompanying drawings that illustrate several examples of the technology described herein. It is understood that other examples may be utilized and various operational changes may be made without departing from the scope of the present disclosure. The following detailed description is not to be taken in a limiting sense, and the scope of the embodiments described herein is defined only by the claims of the issued patent.

Perpetrators of price gouging and sellers that attempt to circumvent item listing policies in the online retail space continually attempt to modify their behavior and/or the characteristics of their item listings in order to avoid detection by automated keyword filters and/or evasive listing machine learning models used to distinguish between potentially evasive item listings and legitimate item listings. As a result, technologies are continuously developed by fraud prevention teams to attempt to detect and prevent evasive item listings in an ever-evolving climate. Accordingly, the actions of bad actors and fraud prevention teams are adversarial in nature, as a change in fraud detection techniques results in evolving fraudster methodologies, and vice versa.

For example, keyword attributes related to high demand items may be searched to identify price gouging. For example, after a hurricane, items such as bottled water, canned food, housing materials, gasoline, etc., may be in high demand. Accordingly, heuristic filters may be used to determine item listings (e.g., on an e-commerce website) that include such keywords as "water," "lumber," "bottled," "canned," "food," "plywood," etc., in order to detect and prevent potential price gouging of such high demand items. However, bad actors may modify the titles of their items to avoid detection using evasive terminology. For example, bad actors may intentionally misspell and/or introduce characters into the titles of their listings to attempt to evade keyword filters. For example, instead of including the terms "bottled water" in the title of a listing, the bad actor may instead include the terms "botttled water" in the listing title. The listing with the intentionally misspelled word (e.g., the addition of an extra "t" in "botttled water") may still be returned in a user's search for "water," and may thus lead some users to pay the higher price—effectively allowing the seller to profit from the natural disaster (e.g., a hurricane) due to low supply and high demand. It is impossible to program heuristic filters to capture all intentionally evasive variations of keywords due to the innumerable different ways in which a bad actor can modify their listings.

Evasive item listings are prevalent in other areas as well. For example, potentially offensive products (such as adult products, etc.) may be limited and/or suppressed during search within certain contexts. For example, searches for children's toys should not return results for adult products. However, certain bad actors may use evasive listing practices to circumvent such protections in order to maximize profits. Such evasive practices by fraudulent sellers may result in negative user experiences and deterioration of trust. In another example, tobacco products and/or vaping products may be subject to various regulations (e.g., promulgated by a regulatory body) that may limit the context in which such products are listed. For example, there may be heuristic filters that are used to attempt to prevent underage users from purchasing and/or being exposed to such products. However, bad actors may attempt to circumvent such filters using intentional misspellings and/or misleading textual descriptions.

Accordingly, described herein is a system that automatically detects evasive item listings (e.g., evasive product listings). In particular, a system that detects textual variation in item listings and uses machine learning approaches to determine whether the textual variation in the item listing amounts to an intentionally-evasive listing. The particular solutions described herein cover complex use cases which typically evade previously-existing evasive listing detection services. For example, certain textual variation (e.g., misspelled words, insertion of special characters in words, etc.) may be acceptable in the context of some item categories, yet impermissible in the context of other categories of items. For example, use of the term "masc" (which is a misspelled word) in an item listing pertaining to medical masks used to prevent/slow the spread of disease may be impermissible. However, use of the misspelled term "masc" in the context of "mascara" may be permissible. The evasive listing detection systems and techniques described herein are able to contextually classify textual variation based on item categories and other factors to determine whether a detected textual variation is permissible, or whether the textual variation is impermissible, and thus constitutes an evasive item listing.

Machine learning techniques, such as those described herein, are often used to form predictions, solve problems, recognize objects in image data for classification, etc. For example, herein machine learning techniques may be used to determine substitute items for a given item. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

FIG. 1 is a block diagram depicting an example system 100 effective to detect evasive listings, according to various embodiments of the present disclosure. In various examples, one or more computing devices may be used to implement the evasive listing detection system 102 and/or the textual variation techniques described herein. To the extent multiple computing devices are used to implement the evasive listing detection system 102, such computing devices may communicate with one another and/or with one or more of the other components depicted in FIG. 1 over a network 104 (e.g., a local area network (LAN) and/or a wide area network (WAN) such as the internet). In various examples, one or more of the components of evasive listing detection system 102 may be omitted in some embodiments and/or additional components may be added. In some examples, some of the components of evasive listing detection system 102 that are shown in FIG. 1 may be implemented by other devices or services which may be configured in communication with the evasive listing detection system 102. For example, the dictionary 106 may be dictionary data that is received from another computing device. In various examples, the evasive listing detection system 102 may be configured in communication with non-transitory computer-readable memory 103 that may store instructions effective to implement the various techniques described herein.

In the various techniques described herein, dictionary 106 may provide a list of terminology that is relevant to a specified items. For example, a specific category of items (e.g., a particular category of evasive listings for which the machine learning models (such as binary classifier 116, a binary classification component) have been trained to detect). The specified items may be items that are prohibited, restricted, illegally marketed, unsafe, potentially fraudulent, and/or which may otherwise be in violation of one or more policies. For example, dictionary 106 may provide category-specific keywords 120 related to a particular category (e.g., COVID terminology). Such category-specific keywords 120 may include potentially sensitive terms such as terms describing and/or otherwise related to products that are expected to be the subject of price gouging attempts, fraud attempts, and/or which may be otherwise associated with evasive listings. In other words, the category-specific keywords 120 may be terms known to be associated with potentially fraudulent activity such as evasive listing practices for the relevant category/use case. In various examples, the sensitive terms may be promulgated by a government agency and/or may be determined based on empirical data. For example, during the COVID-19 pandemic, the Center for Disease Control (CDC) has generated a list of keywords that may relate to products that may be the subject of price gouging. As previously described, the category-specific keywords 120 may be use case dependent. For example, the category-specific keywords 120 for the COVID-19 use case (e.g., prevention of price gouging related to the COVID-19 pandemic) may be different from the category-specific keywords 120 for suppression of offensive products, and different from the category-specific keywords 120 related to tobacco/vaping products.

In various examples, the case-specific dictionaries including the category-specific keywords 120 may be used by heuristic filters to restrict item listings that are deemed non-compliant. However, as previously described, such heuristic filters are unable to handle the large variety of variations and evasive textual variations used by fraudulent actors.

An item data repository 108 may provide item text data 122. Item text data 122 may be text data pertaining to a particular item that is being evaluated for textual variation and to determine whether the item constitutes an evasive listing. The item text data 122 may comprise the title of the item and/or any other text description pertaining to the item. During training of the evasive listing detection system 102, the item data 108 used for training may be labeled with label data (e.g., human annotated label data) indicating whether the particular item text is evasive or not.

Preprocessing component 110 may generate n-gram tokens representing the item text data 122 using any desired tokenization process. For example, word level tokenization, subword level tokenization, byte pair encoding (BPE), etc., may be used to generate n-gram tokens representing the item text data 122. Preprocessing component 110 may also perform various other functions including removal of predefined stop words, lemmatization, stemming, etc. Accordingly, preprocessing component 110 may generate tokens 124 that include a structured representation of the input item text data 122.

The tokens 124 may be provided, along with the category-specific keywords 120 from dictionary 106, to spelling correction 112. Spelling correction 112 may use various processes (as described in further detail below) to correct textual variation (e.g., misspellings) in the tokens 124 based at least in part on comparison with the category-specific keywords 120 and other techniques to generate corrected tokens 126. For example, the spelling correction 112 may use various techniques to transform the textually variated word "m@5k" into the word "mask" using the category-specific keywords 120 from the dictionary and various other algorithms described in further detail below. Further, spelling correction 112 may include logic effective to generate an evasive flag 128 for each of the corrected tokens 126. The various "flags" described herein refer generally to any kind of indicator data and may be instantiated using any number of bits.

The corrected tokens 126 may be provided to a vectorizer 114 that may be effective to generate a numerical representation of the corrected tokens 126 (e.g., word vector 130) for input into binary classifier 116. In various examples, vectorizer 114 may use term frequency-inverse document frequency (TF-IDF) to generate the word vector 130. For example, the values for each of the elements of the word vector 130 may be represented by a TF-IDF score for each of the associated n-grams. TF-IDF scores measure the originality of an n-gram (e.g., a word, phrase, subword, etc.) in a particular corpus (e.g., the dictionary and/or a set of item listings) by comparing the number of times the word appears in the current item text (e.g., among the corrected tokens 126) with the number of documents (e.g., other item listings) that the word appears in (e.g., the document frequency (DF)). In various examples, the word vector 130 may be generated using other techniques. For example, the word vector 130 may be generated using a shallow feed forward neural network and/or using any desired embedding technique, according to the particular implementation. In some examples, use of TF-IDF may be more computationally efficient and may therefore be used to more quickly instantiate the evasive listing detection system 102 for a new and/or updated use case.

Binary classifier 116 may be instantiated using a supervised machine learning algorithm and may be trained using labeled training samples to predict the label data 132 that classifies whether or not the current item listing constitutes an evasive item listing. In one example implementation, the binary classifier 116 may be instantiated using a Random Forest Model, although any desired machine learning approach may be used. Input features to the binary classifier 116 may include the word vector 130 (e.g., including the TF-IDF values for the corrected tokens 126) and/or the per-token evasive flags 128. For example, the sum of all the per-token evasive flags 128 may be used as an input feature for the binary classifier 116. The binary classifier 116 may be trained using labeled positive samples (e.g., item listings of known ground truth evasive samples including ground truth labels) and labeled negative samples (e.g., non-evasive, legitimate item listings). The output of the binary classifier 116 may be label data 132 that represents a binary prediction of whether the item listing is evasive or not. In some examples, binary classifier 116 may also output a confidence score indicating the model's confidence in the prediction.

In some other examples, instead of using the combined per-token evasive flags 128 as input features to the binary classifier 116, the sum of the per-token evasive flags 128 may instead be used as a filter, wherein item listings with a per-token evasive flag sum ≥ a threshold sum may be filtered out (e.g., deemed evasive).

In various examples, a multiclass classifier 118 may optionally be used to predict a subcategory within the concerned category of the evasive listing. For example, for a category of "adult products," the multiclass classifier 118 may predict that a given item listing is of a "potentially offensive" category of adult products that should be suppressed in search results related to children's toys. In various examples, the multiclass classifier 118 may ingest the same features as the binary classifier 116 (e.g., word vector 130, evasive flags 128). In addition, in some examples, the multiclass classifier 118 may also ingest the label data 132 and/or the associated confidence score. The particular combination of features used by either binary classifier 116 and/or multiclass classifier 118 may vary according to the desired implementation. In some examples, the multiclass classifier 118 may be instantiated using multinomial logistic regression. The multiclass classifier 118 may be useful in scenarios where different actions are to be taken depending on the subcategory of the evasive listing. For example, a textually variated "COVID" (e.g., "C OVID") on the subcategory of clothing (e.g., t-shirts) may be an acceptable listing, while the same textual variation in an item listing related to a mask may be impermissible and may result in automatic removal of the item listing. As shown in FIG. 1, the multiclass classifier 118 (if used) outputs the predicted sub-category along with the respective confidence scores for each of the sub-categories 134.

In some examples, the action to be taken for items determined by the evasive listing detection system 102 to be evasive may depend on the sub-category of evasive listings predicted by the multiclass classifier 118. In a Covid use case example, the action taken for evasive listings classified in the subcategory "N95 Masks" may differ from the action taken for evasive listings classified in the subcategory "general masks." For example, the action taken for evasive listings with the subcategory "N95 Masks" may be to suppress the item listing in search results, while the action taken for the subcategory "general masks" may be to alert the seller of the evasive terms. The particular actions taken depend on the desired implementation. Other examples of sub-categories that may be detected using multiclass classifier 118 for the Covid use case may include "antibody products for the COVID-19 virus", "Goggles/glasses for COVID-19", "plastic partitions for COVID-19", etc. The particular sub-categories for a given use case are implementation specific and will vary from use case to use case.

Figure 2:
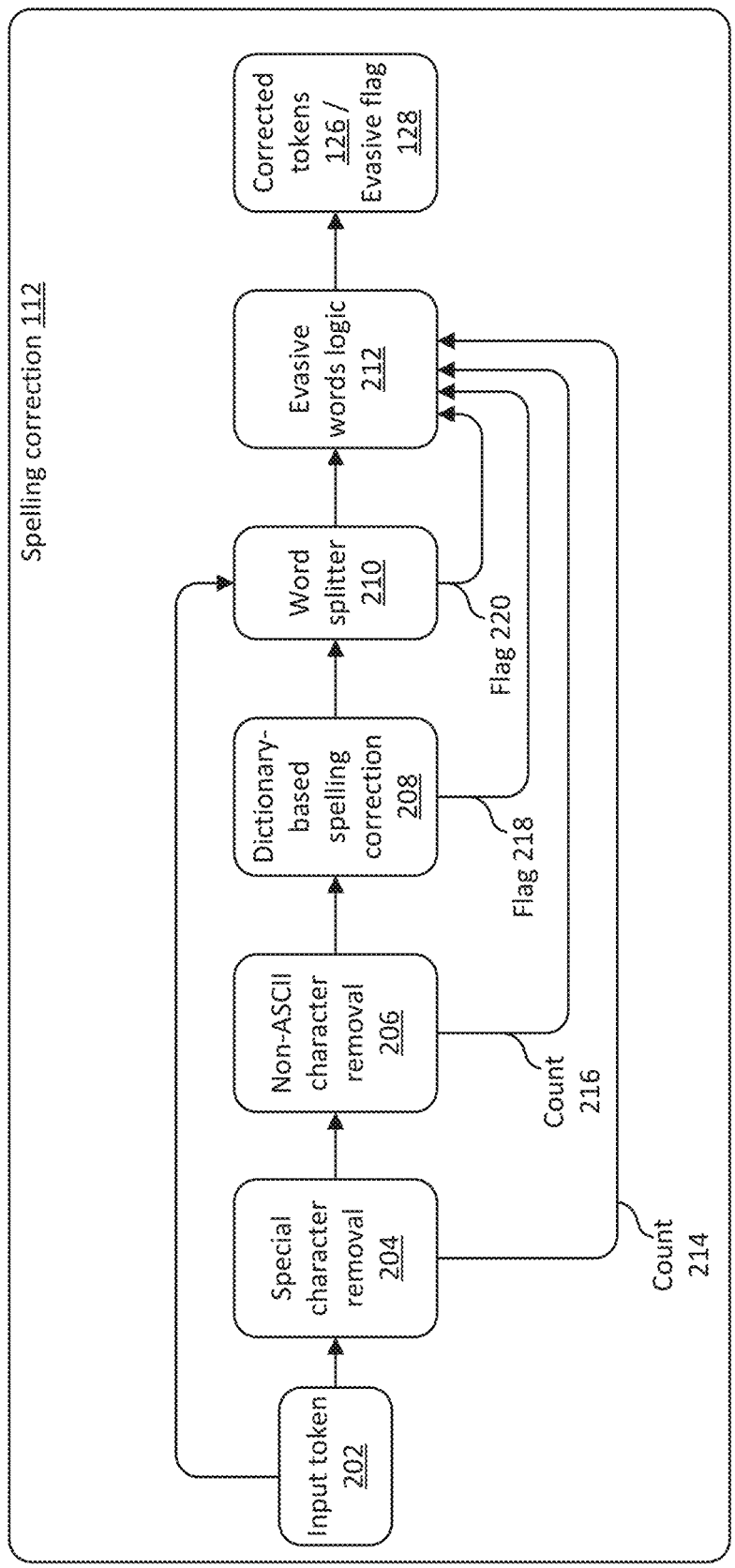
FIG. 2 is a block diagram depicting a spelling correction component of the system of FIG. 1, in accordance with various aspects of the present disclosure.

FIG. 2 is a block diagram depicting a spelling correction component of the system of FIG. 1, in accordance with various aspects of the present disclosure. Many spelling correction techniques use string search approximation. The idea behind string search approximation is in finding a string in a list of strings based on specific edits distance metrics. Strike a Match, Levenshtein, Damerau-Levenshtein, Hamming distance, and Jaro-Winkler are the most widely used string metrics. All search approximation algorithms strive to reduce the number of lookups, reduce the number of full edit distance calculations, and reduce the computation complexity resulting in lower effectiveness for complex textual variations. Evasive item listings are intentionally evading string search by imitating original words in various ways (e.g., using hexadecimal/special characters, numbers, connecting characters with hyphens/underscores, etc., while the common spelling-correction techniques were developed mainly for misspellings. In order to address the complex use cases, multiple text processing techniques are used in spelling correction 112 to optimize computation efficiency and improve the performance of the evasive listing detection system 102.

Each input token 202 (e.g., each of the tokens 124 of FIG. 1) may first be subjected to special character removal 204. Special character removal 204 may remove any special characters from the token and may generate a count 214 that indicates the number of special characters removed. Special characters may be non-alphabetic and non-numeric characters (e.g., any character that is not an English alphanumeric character). For example, for the input token "m_a_s_k" the special character removal may convert the token to "mask" and may generate a count 214 of three, since three underscore special characters were removed. Special character removal 204 may output intermediate tokens that may serve as input to non-ASCII character removal 206.

The output token from special character removal 204 may be passed to non-ASCII character removal 206, which may count and convert each non-ASCII character of the token to an ASCII character. Non-ASCII characters may be characters that are not in the ASCII set. For example, non-ASCII character removal 206 may convert "mask" to "mask" with a count 216 of 4, as each of the four non-ASCII characters is replaced with an ASCII character. In some cases, custom libraries for converting non-ASCII characters to ASCII characters may be used by non-ASCII character removal 206. For example, the custom libraries may convert hexadecimal characters to ASCII characters, etc. Non-ASCII character removal 206 may output intermediate tokens that may serve as input to dictionary-based spelling correction 208.

The output tokens from non-ASCII character removal 206 may be passed to dictionary-based spelling correction 208. Dictionary-based spelling correction 208 may convert the input token into the correctly spelled word based on a dictionary. For example, the dictionary may include the category-specific keywords in dictionary 106 as well as words of a publicly available dictionary. In general, any dictionaries may be used by dictionary-based spelling correction 208 to correct the input tokens. In various examples, the SymSpell algorithm may be used to correct the token's spelling. Additionally, the dictionary-based spelling correction 208 may output a binary flag 218 indicating whether the token required correction or not.

The corrected token output by dictionary-based spelling correction 208 may be passed to word splitter 210. In addition, the original input token 202 may be passed as input to word splitter 210. Some special characters are used for connecting words. For example, "face-mask" uses a hyphen to connect "face" and "mask." The word splitter 210 splits such words into multiple words using a word dictionary (e.g., dictionary 106). For example, word splitter 210 may split "face-mask" into "face" and "mask". In addition, word splitter 210 generates a flag 220 that indicates whether the token is using special characters to connect words (e.g., as in the previous "face-mask" example) or whether the token is using the special characters evasively (e.g., as in the token "face m_a_s_k"). The original input token 202 is used by word splitter 210 as input since the special character removal 204 removes the special characters.

Evasive words logic 212 receives the corrected tokens output by word splitter 210 along with the count 214, count 216, flag 218, and flag 220. Evasive words logic 212 may be logic effective to determine an evasive flag 128 that indicates whether the input token 202 is evasive or not. The specific logic used by evasive words logic 212 may differ depending on the specific implementation and/or the level of risk tolerance. The evasive flag 128 may be determined based on the count 214, count 216, flag 218, and flag 220 as well as based on whether or not the particular word exists in a case-specific word dictionary (e.g., dictionary 106).

For example, words may be more likely to be evasive when they include greater than a threshold number of special characters and/or non-ASCII characters (e.g., when count 214 or count 216 exceeds a pre-defined threshold (defined by evasive words logic 212)). Additionally, if the token requires correction by dictionary-based spelling correction 208, the word may be more likely to be evasive. Similarly, if special characters are used to sub-divide a word ("m_ask"), as opposed to being used to separate two words ("face-mask"), the word may be more likely to be evasive. This may be indicated by flag 220. Accordingly, the evasive words logic 212 may use such input data and a set of pre-defined rules to generate a binary evasive flag 128 indicating whether the particular token is evasive. In addition, the corrected tokens 126 may be output by spelling correction 112.

An example of a particular implementation of evasive words logic 212 is provided below. However, it should be appreciated that any evasive words logic using the various signals (e.g., count 214, count 216, flag 218, flag 220, the corrected tokens, the dictionaries, etc.) may be used, according to the desired implementation.

Evasive Words Logic 212 Variables
A=special character removal count (count 214);
B=Non-ASCII replacement count (count 216);
C=Dictionary-based spelling correction flag (flag 218): 1 for corrected from word in public dictionary, 2 for corrected from target keyword, 0 for other;
D=Word splitter flag (Flag 220): 0 for not a word combination, −1 for split by hyphen and not all words in dictionary, 1 for split by hyphen and all words in dictionary, 9 for split by other character.

Evasive Words Logic 212 Rules Example (for Calculation of Evasive Flag 128)
if D=1, then evasive_flg=0;
elif D=−1 and A<2 and B=0 and C=0 then evasive_flg=0;
elif D=−1 and A≥2 and B=0 and C=0 then evasive_flg=1;
elif D=0 and A=0 and B>0 and C=1 then evasive_flg=1;
elif D=0 and A=0 and B>0 and C=2 then evasive_flg=1
. . .

It should be appreciated that any evasive words logic 212 may be used with one or more of the signals (e.g., count 214, count 216, flag 218, flag 220, the corrected tokens, the dictionaries, etc.) described herein, according to the desired implementation.

FIG. 3 depicts examples of item listing data that may be detected as being evasive, in accordance with various aspects of the present disclosure. In the example of FIG. 3, three item listings (item 1, item 2, and item 3) are shown. Each item includes both text data (e.g., titles of the three items) and category/sub-category metadata identifying one or more categories of the respective items.

Item 1 is associated with the title "Dustproof F.A.C.E. M.A.S.K Reusable with K.N.9.5 Carbon Filters, Disposable M@SK." The evasive listing detection system 102 may detect various evasive words in this title. For example, "F.A.C.E.M.A.S.K", "M@SK", and "K.N.9.5" may all be detected as evasive terms. Additionally, there may be a policy or regulation in which evasive terms associated with the category "Face/Masks" may be impermissible for product listings. Accordingly, these evasive terms for the particular category may violate the policy. Appropriate action may be taken. For example, an alert may be generated, the item listing may be suppressed in search results (in response to a search query), removed, the seller may be notified, and/or warned. The seller's account may be suspended (e.g., due to repeated violations), etc. In general the action to be taken may be implementation specific.

Item 2 includes the title "Smear-free Masc, volumizing." In this case, the evasive listing detection system 102 may detect the evasive word "Masc." However, the category associated with this product is Mascara. It may be acceptable to use misspelled versions of the term "mascara" for items of this category. Accordingly, the item listing for item 2 may be acceptable. Binary classifier 116 may determine that Item 2 is non-evasive based on the text data associated with Item 2 and/or based on a similarity with training samples labeled as non-evasive.

Item 3 includes the title, "Baby Its CÓVI.D Outside 2020 Christmas Long Sleeve T-Shirt". In this case, the evasive listing detection system 102 may detect the evasive word "CÓVI.D". While evasive terms associated with "COVID" and in the category of healthcare products may be impermissible, in some cases, evasive terms associated with "COVID" in non-healthcare and/or medical products may be permissible. Accordingly, since the category of Item 3 is novelty items and T-shirts, this item listing may be acceptable in spite of including the evasive term. However, it the evasive term CÓVI.D was used in the context of a face mask and/or medical product, the evasive term cause such a listing to violate a listing policy.

In various examples, the evasive listing detection system 102 may employ text processing to extract evasive words, and may then search catalog data (e.g., of an e-commerce service) for evasive items that use the evasive words. This may reduce computation cost and lead-time of service implementation by removing the binary classifier 116 and the multiclass classifier 118.

The case-specific word dictionary (e.g., "mask", "COVID", "wipes", etc., in a COVID use case) can be created automatically by applying other approaches such as topic modeling (e.g., LDA), TF-iDF, etc. However, in other examples, expert-provided keywords may be used.

The spelling correction 112 and evasive words logic 212 can be modified and/or augmented using various machine learning techniques such as conditional random fields (CRF), recurrent neural networks (RNNs), long short term memory models (LSTMs), etc., that predict correct operations and/or evasiveness of words. The binary/multiclass classification models may be implemented using Random forests and/or other machine learning techniques. For example, decision trees, Support vector machines, Logistic regression, deep neural networks, etc., may be used.

Figure 4:
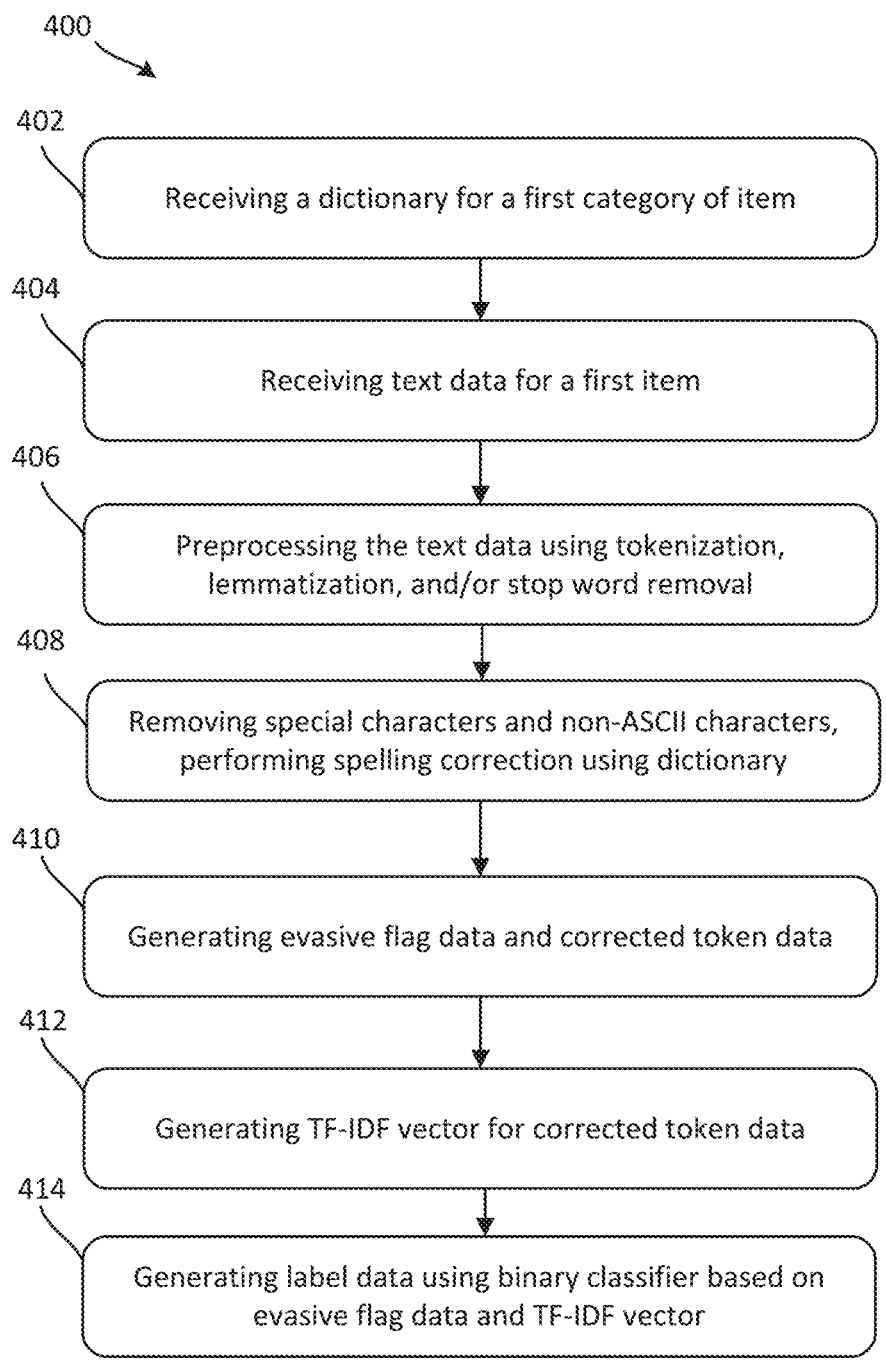
FIG. 4 depicts an example process for detecting evasive item listings, in accordance with various aspects of the present disclosure.

FIG. 4 depicts an example process 400 for detecting evasive item listings, in accordance with various aspects of the present disclosure. Those portions of FIG. 4 that have been previously discussed in reference to FIGS. 1-3 may not be described again for purposes of clarity and brevity. The actions of the process 400 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 400 of FIG. 4 may begin at action 402, at which a dictionary for a first category of item may be received. The dictionary may include keywords and/or keyphrases associated with a use case and/or category of item. For example, the dictionary may include terms related to medical products and may be used to detect potentially evasive item listings in the medical products space. In another example, the dictionary may include terms related to tobacco products for detecting potentially evasive item listings in the tobacco products space, etc.

Processing may continue at action 404, at which text data for a first item may be received. In various examples, the text data may include the title of an item listing, text describing the item and/or features of the item, reviews, metadata describing categories/subcategories of the item, etc.

Processing may continue at action 406, at which preprocessing of the text data may be performed. Preprocessing may include various techniques, such as tokenization of the text data, lemmatization, stemming, stop word removal, etc. After preprocessing, the text data may be represented as a series of n-gram tokens.

Processing may continue at action 408, at which special characters and non-ASCII characters may be removed and spelling correction may be performed using the dictionary received at action 402. For example, special character removal 204 may be performed, non-ASCII character removal 206 may be performed, and dictionary-based spelling correction 208 may be performed as described above during spelling correction 112.

Processing may continue at action 410, at which evasive flag data and corrected token data may be generated. For example, evasive flag data and corrected token data may be generated as described above in reference to FIG. 2. The evasive flag data (e.g., evasive flag 128) may be generated based on the various outputs of the different components of spelling correction 112. In addition, the corrected tokens 126 may be output by spelling correction 112.

Processing may continue at action 412, at which TF-IDF vectors may be generated for the corrected token data. In various examples, a TF-IDF vectorizer (e.g., vectorizer 114 or any other vectorizer component) may be used to generate token embeddings (e.g., numerical representations of the various corrected tokens output by spelling correction 112). It should be appreciated that other vectorizers may be used besides TF-IDF. For example, a pre-trained language model may be used to generate token embeddings.

Processing may continue at action 414, at which label data may be generated using a binary classifier. The label data may be generated using the evasive flag data output by spelling correction 112 and based on the TF-IDF vector representing the spell-corrected tokens. The binary classifier label may indicate whether or not the current listing is evasive and may be trained in a supervised manner. In some examples, although not shown in FIG. 4, a multiclass classifier (e.g., multiclass classifier 118) may be used to predict a subcategory of evasive text of the input item. For example, the multiclass classifier may predict that an evasive listing of the category tobacco products relates to vaping devices.

Figure 5:
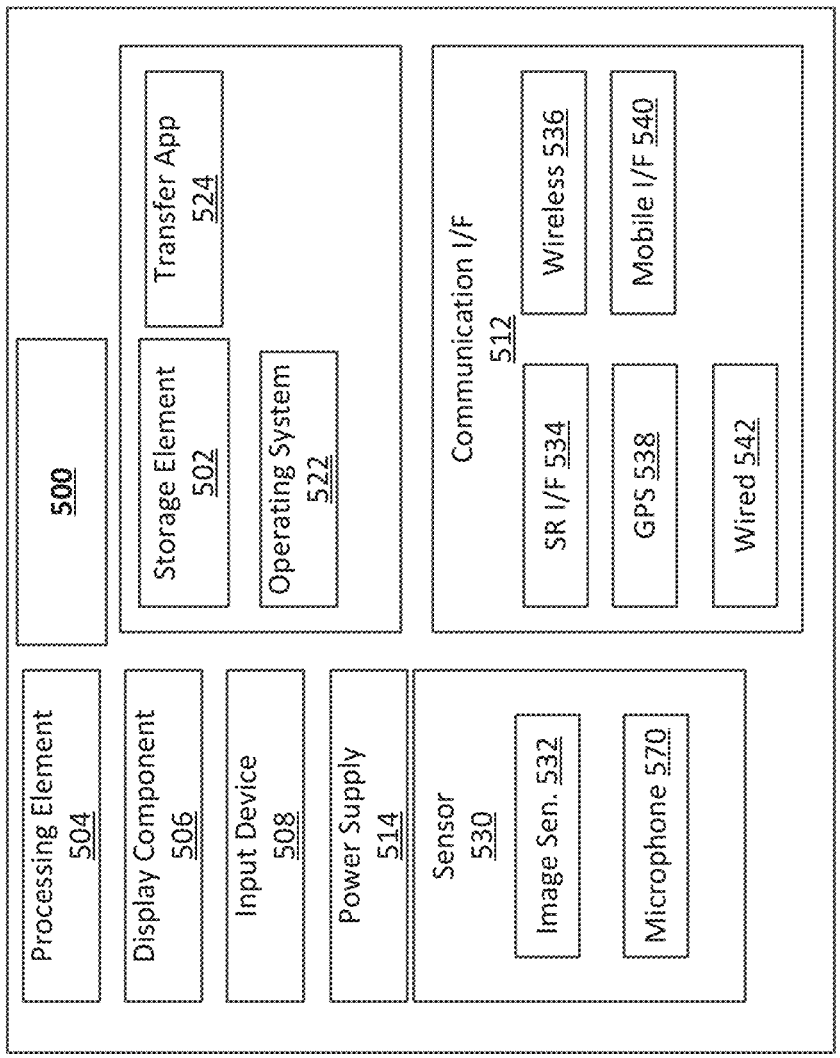
FIG. 5 is a block diagram showing an example architecture of a computing device that may be used in accordance with various aspects of the present disclosure.

FIG. 5 is a block diagram showing an example architecture 500 of a computing device that may be used to detect evasive terms in item listings, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store parameters, and/or machine learning models used for the various techniques described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display the various fields and/or GUIs described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing devices, as described herein, are exemplary, and may be located as a stand-alone device or may be included, in whole or in part, as a component of a larger device or system.

Figure 6:
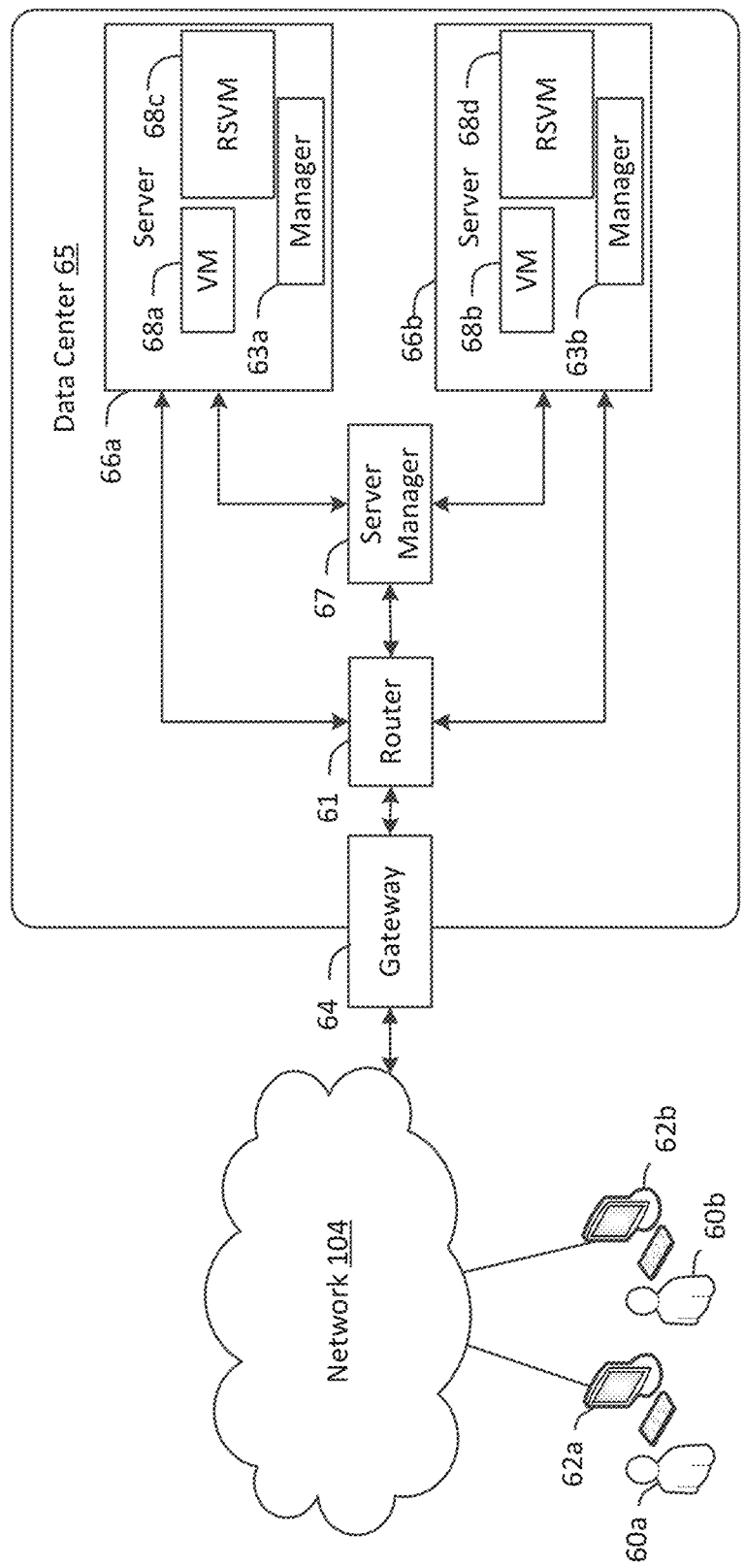
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. For example, the computing environment of FIG. 6 may be used to provide the various techniques for detection of evasive terms described herein as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60*a* and 60*b* (which may be referred herein singularly as user 60 or in the plural as users 60) via user computers 62*a* and 62*b* (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. In various examples, the instances may be configured to execute one or more of the various machine learning techniques described herein.

These services may be configurable with set or custom applications and may be configurable in size, execution, cost, latency, type, duration, accessibility, and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large-scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box, or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed, at least in part, to direct various communications to, from, and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

Although various systems described herein may be embodied in software or code executed by general-purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method to detect evasive product listings, comprising:
   receiving a dictionary related to a first category of items, wherein listing items of the first category of items on an e-commerce website is regulated by at least one of a regulatory body or the e-commerce website, and wherein the dictionary comprises keywords associated with the first category of items;

receiving text data associated with a first item, the text data comprising at least one of a title of the first item or a description of the first item, wherein the first item is associated with the first category of items;

generating a first plurality of tokens representing the text data by performing at least one of stop word removal, lemmatization, or tokenization;

generating a second plurality of tokens using a spelling correction component based on a presence of at least one of special characters or non-American Standard Code for Information Interchange (non-ASCII) characters and further based on the keywords associated with the first category of items;

generating, by the spelling correction component, first indicator data indicating that the text data associated with the first item includes evasive text based on the presence of the at least one of special characters or non-ASCII characters;

determining a first set of parameters for a binary classification component using training data comprising a positive training sample comprising a first vector representing evasive item text data labeled with a first ground truth label and a negative training sample comprising a second vector representing non-evasive item text data labeled with a second ground truth label;

generating, by a vectorizer component, a third vector comprising a numerical representation of the second plurality of tokens;

inputting the first indicator data and the third vector into the binary classification component;

generating, by the binary classification component using the first set of parameters, label data indicating that the text data associated with the first item is evasive; and generating an alert based on the label data indicating that the text data associated with the first item is evasive.

2. The computer-implemented method of claim 1, further comprising determining, for each token of the second plurality of tokens, a respective term frequency inverse document frequency (TF-IDF) score, wherein the third vector comprises the respective TF-IDF scores.

3. The computer-implemented method of claim 1, further comprising determining, by a multi-class classification model, a sub-category of the text data associated with a first item, wherein the multi-class classification model uses multinomial logistic regression to predict the sub-category based at least in part on the third vector and the label data.

4. A method of detecting evasive listings, comprising:
receiving a list of keywords associated with a first category of specified items;
receiving text data associated with a first item, wherein the first item is associated with the first category;
generating a plurality of tokens representing a corrected version of the text data using spell correction techniques and based at least in part on the list of keywords;
generating first indicator data indicating that the text data constitutes evasive text based at least in part on the generation of the plurality of tokens;
determining a first set of parameters for a binary classifier using training data comprising a first training sample comprising a first vector representing evasive item text data labeled with a first ground truth label and a second training sample comprising a second vector representing non-evasive item text data labeled with a second ground truth label;
inputting the first indicator data and a numerical representation of the plurality of tokens into the binary classifier trained to generate label data indicating whether text data associated with a given item is evasive or non-evasive;
generating, using the binary classifier and the first set of parameters, label data indicating that the text data associated with the first item is evasive; and
performing an action based at least in part on the label data, wherein the action affects an accessibility of the first item in response to a search query.

5. The method of claim 4, further comprising generating first intermediate tokens from the text data using one or more of tokenization, lemmatization, and stop word removal, wherein the plurality of tokens is generated based at least in part on the first intermediate tokens.

6. The method of claim 5, further comprising:
determining, for a first token of the first intermediate tokens, a number of special characters present in the first token; and
removing the special characters to generate a second intermediate token.

7. The method of claim 5, further comprising:
determining, for a first token of the first intermediate tokens, a number of non-American Standard Code for Information Interchange (ASCII) characters present in the first token; and
removing the non-ASCII characters to generate a second intermediate token.

8. The method of claim 5, further comprising:
determining, for a first token of the first intermediate tokens, that the first token comprises two words separated by one or more special characters; and
separating the first token into two tokens by removing the one or more special characters and generating a respective token for each of the two words.

9. The method of claim 5, further comprising:
correcting a spelling of a first token of the first intermediate tokens by matching the first token to a word present in the list of keywords;
generating second indicator data indicating that the spelling of the first token was incorrect; and
generating the plurality of tokens based at least in part on a corrected spelling of the first token and the second indicator data.

10. The method of claim 4, further comprising:
determining, for each token of the plurality of tokens, a respective term frequency inverse document frequency (TF-IDF) score, wherein the numerical representation of the plurality of tokens comprises the respective TF-IDF score for each token of the plurality of tokens.

11. The method of claim 4, further comprising determining, by a multi-class classification model, a predicted sub-category of the text data associated with a first item, wherein the multi-class classification model determines the predicted sub-category based at least in part on the numerical representation of the plurality of tokens and the label data.

12. The method of claim 4, wherein the action comprises removing a listing on an e-commerce website of the first item.

13. A system comprising:
at least one processor; and
non-transitory computer-readable memory storing instructions that, when executed by the at least one processor, are effective to:
receive a list of keywords associated with a first category of specified items;
receive text data associated with a first item, wherein the first item is associated with the first category;

generate a plurality of tokens representing a corrected version of the text data using spell correction techniques and based at least in part on the list of keywords;

generate first indicator data indicating that the text data constitutes evasive text based at least in part on the generation of the plurality of tokens;

determine a first set of parameters for a binary classifier using training data comprising a first training sample comprising a first vector representing evasive item text data labeled with a first ground truth label and a second training sample comprising a second vector representing non-evasive item text data labeled with a second ground truth label;

input the first indicator data and a numerical representation of the plurality of tokens into the binary classifier trained to generate label data indicating whether text data associated with a given item is evasive or non-evasive;

generate, using the binary classifier and the first set of parameters, label data indicating that the text data associated with the first item is evasive; and perform an action based at least in part on the label data, wherein the action affects an accessibility of the first item in response to a search query.

14. The system of claim 13, the non-transitory computer-readable memory storing further instructions that, when executed by the at least one processor, are further effective to generate first intermediate tokens from the text data using one or more of tokenization, lemmatization, and stop word removal, wherein the plurality of tokens is generated based at least in part on the first intermediate tokens.

15. The system of claim 14, the non-transitory computer-readable memory storing further instructions that, when executed by the at least one processor, are further effective to:

determine, for a first token of the first intermediate tokens, a number of special characters present in the first token; and remove the special characters to generate a second intermediate token.

16. The system of claim 14, the non-transitory computer-readable memory storing further instructions that, when executed by the at least one processor, are further effective to:

determine, for a first token of the first intermediate tokens, a number of non-American Standard Code for Information Interchange (ASCII) characters present in the first token; and remove the non-ASCII characters to generate a second intermediate token.

17. The system of claim 14, the non-transitory computer-readable memory storing further instructions that, when executed by the at least one processor, are further effective to:

determine, for a first token of the first intermediate tokens, that the first token comprises two words separated by one or more special characters; and separate the first token into two tokens by removing the one or more special characters and generating a respective token for each of the two words.

18. The system of claim 14, the non-transitory computer-readable memory storing further instructions that, when executed by the at least one processor, are further effective to:

correct a spelling of a first token of the first intermediate tokens by matching the first token to a word present in the list of keywords;

generate second indicator data indicating that the spelling of the first token was incorrect; and generate the plurality of tokens based at least in part on a corrected spelling of the first token and the second indicator data.

19. The system of claim 13, the non-transitory computer-readable memory storing further instructions that, when executed by the at least one processor, are further effective to:

determine, for each token of the plurality of tokens, a respective term frequency inverse document frequency (TF-IDF) score, wherein the numerical representation of the plurality of tokens comprises the respective TF-IDF score for each token of the plurality of tokens.

20. The system of claim 13, the non-transitory computer-readable memory storing further instructions that, when executed by the at least one processor, are further effective to:

determine, by a multi-class classification model, a predicted sub-category of the text data associated with a first item, wherein the multi-class classification model determines the predicted sub-category based at least in part on the numerical representation of the plurality of tokens and the label data.

\* \* \* \* \*